United States Patent
Suzuki

(12) 
(10) Patent No.: US 7,136,576 B1
(45) Date of Patent: Nov. 14, 2006

(54) METHOD OF AND APPARATUS FOR RECORDING SEARCH INFORMATION SIMULTANEOUSLY WITH ENCODING OF DATA ABLE TO UNDERGO SPECIAL REPRODUCTION

(75) Inventor: Junzo Suzuki, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/357,744

(22) Filed: Jul. 20, 1999

(30) Foreign Application Priority Data

Jan. 7, 1999 (JP) ............................... P11-002077

(51) Int. Cl.
*H04N 7/26* (2006.01)

(52) U.S. Cl. ............................ 386/109; 386/33; 386/34

(58) Field of Classification Search .................. 386/96, 386/82, 90, 91, 109, 112, 124, 46, 125, 127, 386/128

See application file for complete search history.

(56) References Cited

U.S. PATENT DOCUMENTS

| | | | |
|---|---|---|---|
| 5,684,773 A * | 11/1997 | Hayashi | 369/47.35 |
| 5,745,643 A * | 4/1998 | Mishina | 386/106 |
| 6,091,674 A * | 7/2000 | Tozaki et al. | 369/30.04 |
| 6,181,870 B1 * | 1/2001 | Okada et al. | 386/95 |
| 6,301,587 B1 * | 10/2001 | Kim et al. | 707/104.1 |

FOREIGN PATENT DOCUMENTS

JP 2747268 2/1998

\* cited by examiner

*Primary Examiner*—James J. Groody
*Assistant Examiner*—James A. Fletcher
(74) *Attorney, Agent, or Firm*—Nath & Associates PLLC; Gregory B. Kang; Teresa M. Arroyo

(57) ABSTRACT

Video and audio data is packed as defined in the MPEG and is stored into within a video object unit as a row of packs to be reproduced within a prescribed period of time. Data cells each consisting of a plurality of units are arrayed to constitute a video object. A navigation pack is disposed at a foremost position of the row of packs in the unit. A data cell identification number of the unit is set according to the recordable time length of one data cell that is designated beforehand and actual recording time length. Further, data reproduction termination time is set according to the signal processing time length that is designated beforehand. Furthermore, the termination addresses of one or a plurality of reference information pieces are set according to the predetermined size of reference information that is designated beforehand.

18 Claims, 12 Drawing Sheets

FIG. 11

| | Content | (Description order) Number of bytes |
|---|---|---|
| DSI_GI | DSI General Information | 32bytes |
| SML_PBI | Seamless Playback Information | 148bytes |
| SML_AGLI | Angle Information for seamless | 54bytes |
| VOBU_SRI | VOB Unit Search Information | 168bytes |
| SYNCI | Synchronous Information | 144bytes |
| reserved | | 471bytes |
| | Total | 1017bytes |

FIG. 12

| | Content (Description order) | Number of bytes |
|---|---|---|
| (1) NV_PCK_SCR | SCR_base of NV_PCK | 4bytes |
| (2) NV_PCK_LBN | LBN of NV_PCK | 4bytes |
| (3) VOBU_EA | End address of VOBU | 4bytes |
| (4) VOBU_1STREF_EA | End address of the first Reference Picture in VOBU | 4bytes |
| (5) VOBU_2NDREF_EA | End address of the second Reference Picture in VOBU | 4bytes |
| (6) VOBU_3RDREF_EA | End address of the third Reference Picture in VOBU | 4bytes |
| (7) VOBU_VOB_IDN | VOB ID number of the VOBU | 2bytes |
| reserved | reserved | 1bytes |
| (8) VOBU_C_IDN | Cell ID number of the VOBU | 1bytes |
| (9) C_ELTM | Cell Elapse Time | 4bytes |
| | Total | 32bytes |

FIG. 13

| | Content | (Description order) Number of bytes |
|---|---|---|
| (1) VOBU_SML_CAT | Category of seamless VOBU | 2bytes |
| (2) ILVU_EA | End address of Interleaved Unit | 4bytes |
| (3) NXT_ILVU_SA | Start address of the next Interleaved Unit | 4bytes |
| (4) NXT_ILVU_SZ | Size of the next Interleaved Unit | 2bytes |
| (5) VOB_V_S_PTM | Video Start PTM in VOB | 4bytes |
| (6) VOB_V_E_PTM | Video End PTM in VOB | 4bytes |
| (7) VOB_A_STP_PTM | Audio Stop PTM in VOB | 8bytes×8 |
| (8) VOB_A_GAP_LEN | Audio Gap Length in VOB | 8bytes×8 |
| | Total | 148bytes |

METHOD OF AND APPARATUS FOR RECORDING SEARCH INFORMATION SIMULTANEOUSLY WITH ENCODING OF DATA ABLE TO UNDERGO SPECIAL REPRODUCTION

BACKGROUND OF THE INVENTION

1. Field of the Invention

The present invention relates to a recording method of and a recording apparatus for recording search information that is used when searching and reproducing data able to undergo special reproduction (such as high speed image searching) into a recording medium enabling recording therein at least once. Particularly, the invention concerns a data recording method and a data recording apparatus that make it possible to produce and record search information simultaneously with the encoding of data that is recorded into a recording medium.

2. Related Art

As a generally known optical disk that enables recording therein with a high density of video data covering a significantly large length of time and that has had recorded therein data containing therein navigation data that navigates data able to undergo special reproduction (such as high speed image searching), a so-called "DVD-VIDEO" has in recent years been made commercially available. Such an optical disk is called "a ROM" and further recording of data is impossible with respect thereto. From this point of view, as an optical disk that can record therein data containing navigation data for navigating data able to undergo special reproduction, a so-called "DVD-R", DVD-RW, or "DVD-RAM" has in recent years been already made commercially available.

Also, recently, a data compression system with respect to a moving picture has been internationally standardized as an MPEG (Moving Picture Experts Group) system. This MPEG system is known as a system for performing variable compression on video data. In this MPEG system there is regulated a compression system that is called "an MPEG 2". In this MPEG 2, regulation is made of setting wherein, in order that moving picture data and audio data can be transferred and reproduced in synchronism with each other there are set a transfer starting time and reproduction starting time that have been prepared by expressing the respective data by the use of a reference time.

Meanwhile, it is pointed out that mere use of only the information of such transfer starting time and reproduction starting time alone, although no problem arises when performing normal reproduction, makes it difficult to perform special reproduction such as fast forward wind reproduction and reverse wind reproduction, random reproduction, etc. or to perform reproduction processing such as that causing the system to have interactivity.

Under the above-described circumstances, there have been made various kinds of proposals that include a reproduction method wherein search information that is used when searching and reproducing data (e.g., video data, audio data, etc.) able to undergo special reproduction is previously recorded in an optical disk, whereby this special reproduction is enabled by referring to this search information at the time of reproduction.

However, the contents of the search information can be determined only after having encoded data capable of special reproduction such as video data and audio data that are going to be recorded in an optical disk and having finally produced all the recording data. In addition, this search information is recorded after having recorded all the recording data in the optical disk. Therefore, it is impossible to perform special reproduction immediately after having recorded, for example, video data and audio data.

SUMMARY OF THE INVENTION

The present invention has been made in view of the above-described problems and has an object to provide a data recording method and a data recording apparatus that produces search information used for searching and reproducing data capable of special reproduction on a real-time basis and that enable recording thereof into a recording medium while encoding the recording data.

To attain the above object, according to an aspect of the present invention, there is provided a data recording method wherein input data is packed into a plurality of packs as defined in a prescribed signal processing system; the plurality of packs are stored into within a unit as a row of packs to be reproduced within a prescribed period of time; one or more units constitute a data cell; one or more data cells are arrayed to thereby constitute an object; a search information pack having prescribed search information is disposed at a foremost position of the row of packs in the unit; the search information includes at least a data reproduction termination time and data cell identification number of within the object; and an object set consisting of one or more objects is recorded into a recording medium, the data recording method comprising the step of: setting the data cell identification number of the unit to be stored into within the search information pack according to a recordable time length of one data cell that is designated beforehand and actual recording time length.

According to the present invention, the search information that is used for searching and reproducing data capable of special reproduction can be produced on a real time basis and also can be recorded into the recording medium while encoding the recording data. Accordingly, it becomes possible to search and reproduce necessary information, for example, immediately after recording has been completed and it is also possible to omit the use of a memory for storing the reproduction termination time beforehand.

In a preferred embodiment of the present invention, the input data consists of at least video data and audio data; and in the prescribed signal processing system the video data and audio data are compression encoded.

To attain the above object, there is also provided a data recording method wherein input data is packed into a plurality of packs as defined in a prescribed signal processing system; the plurality of packs are stored into within a unit as a row of packs to be reproduced within a prescribed period of time; one or more units constitute a data cell; one or more data cells are arrayed to thereby constitute an object; a search information pack having prescribed search information is disposed at a foremost position of the row of packs in the unit; the search information includes at least a data reproduction termination time of within the object; and an object set consisting of one or more objects is recorded into a recording medium, the data recording method comprising the step of: setting the data reproduction termination time to be stored into within the search information pack according to a signal processing time length that is designated beforehand.

According to the present invention, the search information that is used for searching and reproducing data capable of special reproduction can be produced on a real time basis and also can be recorded into the recording medium while encoding the recording data. Accordingly, it becomes possible to search and reproduce necessary information, for example, immediately after recording has been completed and it is also possible to omit the use of a memory for storing the reproduction termination time beforehand.

In a preferred embodiment of the present invention, the input data consists of at least video data and audio data; and in the prescribed signal processing system the video data and audio data are compression encoded.

To attain the above object, there is also provided a data recording method wherein input data is packed into a plurality of packs as defined in a prescribed signal processing system; the plurality of packs are stored into within a unit as a row of packs to be reproduced within a prescribed period of time; one or more units constitute a data cell; one or more data cells are arrayed to thereby constitute an object; a search information pack having prescribed search information is disposed at a foremost position of the row of packs in the unit; the search information includes at least a data reproduction termination time and termination addresses of one or a plurality of reference information pieces of within the object; and an object set consisting of one or more objects is recorded into a recording medium, the data recording method comprising the step of: setting the termination addresses of one or the plurality of reference information pieces to be stored into within the search information pack according to a predetermined size of reference information that is designated beforehand.

According to the present invention, the search information that is used for searching and reproducing data capable of special reproduction can be produced on a real time basis and also can be recorded into the recording medium while encoding the recording data. Accordingly, it becomes possible to search and reproduce necessary information, for example, immediately after recording has been completed and it is also possible to omit the use of a memory for storing the reproduction termination time beforehand.

In a preferred embodiment of the present invention, the input data consists of at least video data and audio data; and in the prescribed signal processing system the video data and audio data are compression encoded.

In a preferred embodiment of the present invention, the termination addresses of the one or the plurality of reference information pieces are termination addresses of reference pictures that are recorded as the compression encoded video data.

To attain the above object, according to another aspect of the present invention, there is provided a data recording apparatus wherein input data is packed into a plurality of packs as defined in a prescribed signal processing system; the plurality of packs are stored into within a unit as a row of packs to be reproduced within a prescribed period of time; one or more units constitute a data cell; one or more data cells are arrayed to thereby constitute an object; a search information pack having prescribed search information is disposed at a foremost position of the row of packs in the unit; the search information includes at least a data reproduction termination time and data cell identification number of within the object; and an object set consisting of one or more objects is recorded into a recording medium, the data recording apparatus comprising: data cell identification number setting means for setting the data cell identification number of the unit to be stored into within the search information pack according to a recordable time length of one data cell that is designated beforehand and actual recording time length.

According to the present invention, the search information that is used for searching and reproducing data capable of special reproduction can be produced on a real time basis and also can be recorded into the recording medium while encoding the recording data. Accordingly, it becomes possible to search and reproduce necessary information, for example, immediately after recording has been completed and it is also possible to omit the use of a memory for storing the reproduction termination time beforehand.

In a preferred embodiment of the present invention, the input data consists of at least video data and audio data, and the data recording apparatus further comprises signal processing means for compression encoding the video data and audio data as defined in the prescribed signal processing system.

To attain the above object, there is also provided a data recording apparatus wherein input data is packed into a plurality of packs as defined in a prescribed signal processing system; the plurality of packs are stored into within a unit as a row of packs to be reproduced within a prescribed period of time; one or more units constitute a data cell; one or more data cells are arrayed to thereby constitute an object; a search information pack having prescribed search information is disposed at a foremost position of the row of packs in the unit; the search information includes at least a data reproduction termination time of within the object; and an object set consisting of one or more objects is recorded into a recording medium, the data recording apparatus comprising: signal processing time setting means for setting the data reproduction termination time to be stored into within the search information pack according to a signal processing time length that is designated beforehand.

According to the present invention, the search information that is used for searching and reproducing data capable of special reproduction can be produced on a real time basis and also can be recorded into the recording medium while encoding the recording data. Accordingly, it becomes possible to search and reproduce necessary information, for example, immediately after recording has been completed and it is also possible to omit the use of a memory for storing the reproduction termination time beforehand.

In a preferred embodiment of the present invention, the input data consists of at least video data and audio data, and the data recording apparatus further comprises signal processing means for compression encoding the video data and audio data as defined in the prescribed signal processing system.

To attain the above object, there is also provided a data recording apparatus wherein input data is packed into a plurality of packs as defined in a prescribed signal processing system; the plurality of packs are stored into within a unit as a row of packs to be reproduced within a prescribed period of time; one or more units constitute a data cell; one or more data cells are arrayed to thereby constitute an object; a search information pack having prescribed search information is disposed at a foremost position of the row of packs in the unit; the search information includes at least a data reproduction termination time and termination addresses of one or a plurality of reference information pieces of within the object; and an object set consisting of one or more objects is recorded into a recording medium, the data recording apparatus comprising: reference information termination address setting means for setting the termination addresses of one or the plurality of reference information pieces to be stored into within the search information pack according to a predetermined size of reference information that is designated beforehand.

According to the present invention, the search information that is used for searching and reproducing data capable of special reproduction can be produced on a real time basis and also can be recorded into the recording medium while encoding the recording data. Accordingly, it becomes possible to search and reproduce necessary information, for example, immediately after recording has been completed and it is also possible to omit the use of a memory for storing the reproduction termination time beforehand.

In a preferred embodiment of the present invention, the input data consists of at least video data and audio data, and the data recording apparatus further comprises signal processing means for compression encoding the video data and audio data as defined in the prescribed signal processing system.

In a preferred embodiment of the present invention, the reference information termination setting means sets the termination address of a reference picture recorded as the compression encoded video data, as the termination address of the reference information.

To attain the above object, according to still another aspect of the present invention, there is provided a data recording method wherein input data is packed into a plurality of packs as defined in a prescribed signal processing system; the plurality of packs are stored into within a unit as a row of packs to be reproduced within a prescribed period of time; one or more units constitute a data cell; one or more data cells are arrayed to thereby constitute an object; a search information pack having prescribed search information is disposed at a foremost position of the row of packs in the unit; the search information includes at least a data reproduction termination time of within the object; and an object set consisting of one or more objects is recorded into a recording medium, the data recording method comprising the step of: setting the data reproduction termination time to be stored into within the search information pack at least according to a recordable capacity of the recording medium that has been obtained from a volume and file structure area recorded in the recording medium and a bit rate that has been obtained from the system information.

According to the present invention, the search information that is used for searching and reproducing data capable of special reproduction can be produced on a real time basis and also can be recorded into the recording medium while encoding the recording data. Accordingly, it becomes possible to search and reproduce necessary information, for example, immediately after recording has been completed and it is also possible to omit the use of a memory for storing the reproduction termination time beforehand. Further, it becomes possible to perform highly efficient recording with no useless information being added and without the user doing complex setting.

In a preferred embodiment of the present invention, a factor that represents how many units the object is constructed of is determined as a maximal positive integer that satisfies a following inequality:

$$VOF \leq (FSS \times FR)/(VTF \times BR \times GF)$$

where the VOF represents a factor that represents how many units the object is constructed of; the FSS represents the recordable capacity of the recording medium; the FR represents a number of frames that are recorded during a unit length of time; the VTF represents a factor that represents a number of objects in the object set composed of a plurality of the objects; the BR represents the bit rate of the object; and the GF represents a factor that represents a number of frames in the group composed of a plurality of the frames.

In a preferred embodiment of the present invention, the input data consists of at least video data and audio data; and in the prescribed signal processing system the video data and audio data are compression encoded.

The nature, principle and utility of the invention will become more apparent from the following detailed description when read in conjunction with the accompanying drawings.

BRIEF DESCRIPTION OF THE DRAWINGS

In the accompanying drawings:

FIG. 11 is a explanatory view illustrating the contents of data search information (DSI) described in the navigation pack (NV_PCK) in accordance with the DVD-video standard or specifications;

FIG. 12 is an explanatory view illustrating the contents of DSI general information (DSI_GI) described in the DSI in accordance with the DVD-video standard or specifications;

FIG. 13 is an explanatory view illustrating the contents of seamless playback information (SML_PBI) described in the DSI in accordance with the DVD-video standard or specifications.

DESCRIPTION OF THE PREFERRED EMBODIMENTS

An embodiment of the present invention will now be explained with reference to the drawings.

Figure 1:
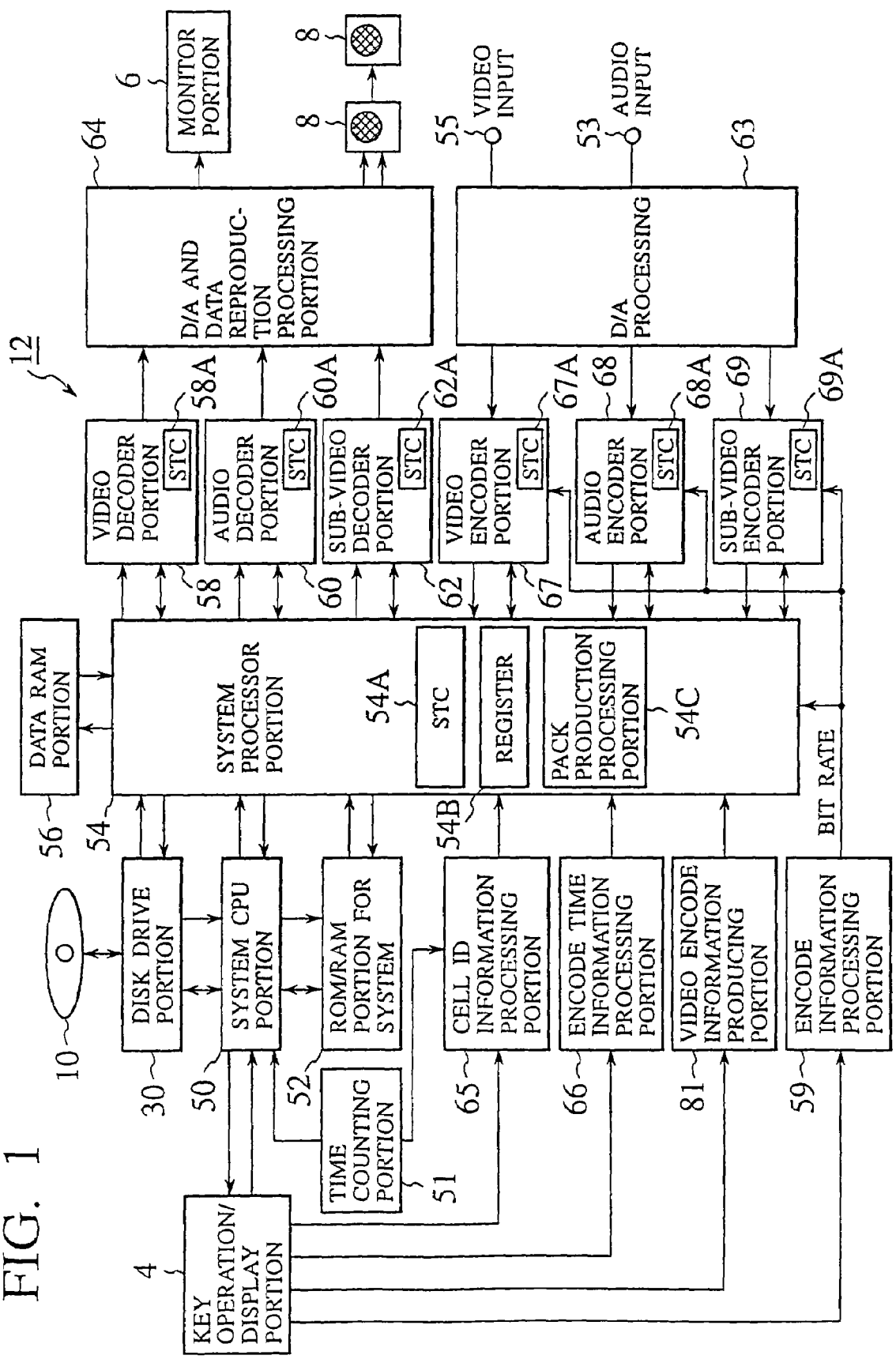
FIG. 1 is a block diagram schematically illustrating an optical disk recording and reproducing apparatus according to an embodiment of the present invention.

FIG. 1 illustrates a schematic construction of an optical disk recording and reproducing apparatus 12 that records and reproduce video data (main video data) and audio data into, and from, an optical disk 10 that is a digital video disk or a digital versatile disk (DVD) recordable once or rewritable a plurality of times.

Figure 2:
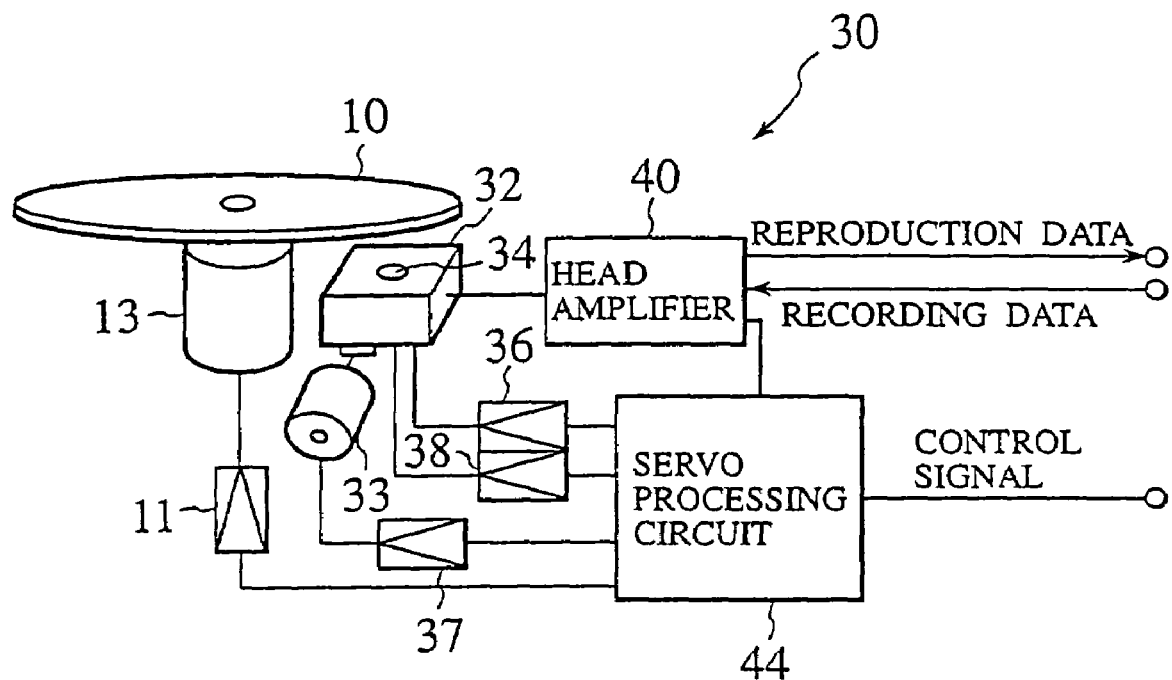
FIG. 2 is a block diagram illustrating the detail of a disk drive portion.
Figure 3:
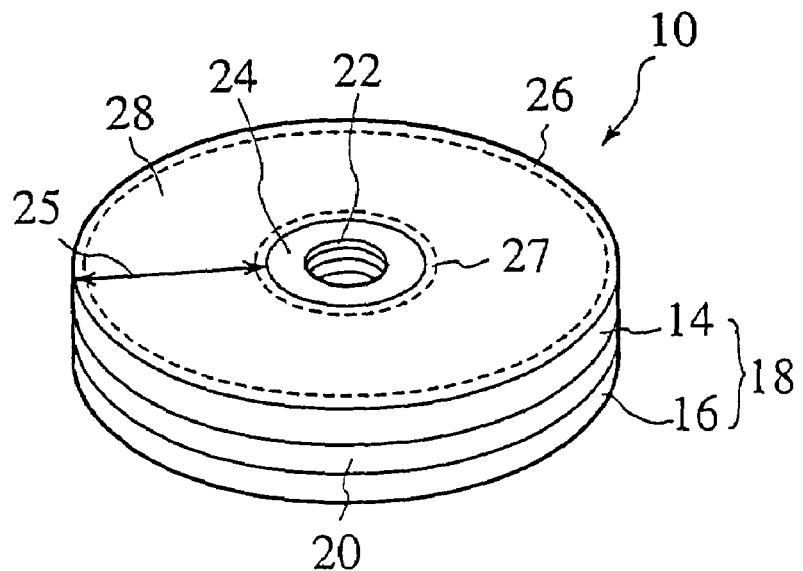
FIG. 3 is a perspective view schematically illustrating the structure of an optical disk loaded on the disk drive portion.

Also, in FIG. 2 illustration is made of a concrete construction of a disk drive portion for driving the optical disk 10 illustrated in FIG. 1 and in FIG. 3 illustration is made of a concrete structure of the optical disk 10 illustrated in FIGS. 1 and 2.

The optical disk recording and reproducing apparatus 12 according to the first embodiment of the present invention, in order to make it possible to produce search information that is used for searching and reproducing data capable of special reproduction, i.e., navigation data as later described for navigating, e.g., data capable of special reproduction such as video data (main video data) and audio data on a real time basis on the optical disk 10 while encoding the video data and audio data and, immediately after the video data and audio data has finished their recording, to perform special reproduction of the thus-recorded data, is arranged to make the following settings. Namely, as described later, setting is performed of the recordable time length of a cell in a cell ID information processing portion 65 and setting is performed of, while comparing the recordable time length information of the cell and the recording time length during which recording time is passing, the cell identification number that is one of the navigation data pieces. Further, setting is performed beforehand of the encoding time length in the encode time information processing portion 66 and setting is performed of the reproduction termination time length of video and audio data that is one of the navigation data pieces according to the encoding time length. Further, setting is performed, as later described, of a predetermined size of a reference picture beforehand in a video encode information production portion 81 and setting is performed of the termination addresses of one or a plurality of reference pictures that are among the navigation data pieces according to the predetermined size of the reference picture. However, here, before explaining the construction and contents for enabling realization of special reproduction that is made immediately after having finished recording such video data and audio data, first, the schematic construction and operation of the optical disk recording and reproducing apparatus 12 of this embodiment will be explained and further a logical format of the optical disk 10 will be explained in detail.

As illustrated in FIG. 1, the optical disk recording and reproducing apparatus 12 according to this embodiment is equipped with a key operation/display portion 4, monitor portion 6, and speaker portion 8. Here, by the user operating the key operation/display portion 4 and thereby instructing the recording and reproduction of data, the data is recorded with respect to the optical disk 10 and the recorded data is also reproduced from the optical disk 10.

Analog video signals, sub-video signals as later described, and audio signals that have been input are converted by digital conversion to video data (main video data) and sub-video data, and audio data. The above-described video data and sub-video data, and audio data are respectively compression encoded and are thereby made into recording data and are recorded into the optical disk 10. It is to be noted that although in the construction example of FIG. 1 sub-video data also is recorded together with the video data that is main video data, sub-video data is not necessarily needed to be recorded.

On the other hand, the reproduction data that has been reproduced from the optical disk 10 is video data and audio data, and sub-video data that have been compression encoded. The thus-compression encoded data are respectively extension decoded and thereafter analog conversion is performed thereon. The thus-obtained analog signals are sent to the monitor portion 6 or speaker portion 8 as the video signal and audio signal, and sub-video signal. The monitor portion 6 displays an image corresponding to the video signal and the speaker portion 8 generates a voice corresponding to the audio signal.

As already known, the optical disk 10 has various structures. This optical disk 10 is one that enables data to be recorded with a high density only once or that enables data to be rewritten a plurality of times. It has, for example, a structure such as that illustrated in FIG. 3.

The optical disk 10 such as that illustrated in FIG. 3 is composed of a pair of composite layers 18 and a bonding layer 20 interposed between this pair of composite layers. Each of the paired composite disk layers 18 is composed of a transparent substrate 14 and a recording layer 16. The recording layer 16 is made into a layer that enables recording to be made only once or that enables rewrite to be made a plurality of times. In each of the composite disk layers 18, the recording layer 16 is disposed so as to come into contact with the surface of the bonding layer 20.

Also, the optical disk 10 has provided therein a center hole 22. And at around the center hole 22 of each of the both surfaces thereof there is provided a clamping region 24 for pressing the optical disk 10 when the same is rotated. When the optical disk 10 has been loaded onto the optical disk recording and reproducing apparatus 12, a spindle of a spindle motor 13 illustrated in FIG. 2 is inserted into the center hole 22. During the rotation of the disk, the optical disk 10 is clamped by the clamping regions 24.

Further, as illustrated in FIG. 3, the optical disk 10 has around the clamping region 24 of each of the both surfaces thereof an information region 25 into which information can be recorded. The outer-peripheral region of each information region 25 is made to be a lead-out region 26 and the inner-peripheral region thereof in contact with the clamping region 24 is made to be a lead-in region 27. Further, the region between the lead-out region 26 and the lead-in region 27 is determined as being a data recording region 28.

As illustrated in FIG. 1, the above-described optical disk recording and reproducing apparatus 12 is further constructed of a disk drive portion 30, system CPU portion 50, system ROM/RAM portion 52, system processor portion 54, data RAM portion 56, video decoder portion 58, audio decoder portion 60, sub-video decoder portion 62, D/A and data reproduction processing portion 64, video encoder portion 67, audio encoder portion 68, sub-video encoder portion 69, and A/D processing portion 63. The apparatus 12 is further constructed of a cell ID (cell identification) information processing portion 65, video encode information producing portion 81, and encode time information processing portion 66 that will be respectively described later. It is to be noted that although an encode information processing portion 59 will be explained in a second embodiment as later described, this encode information processing portion 59 is a portion where there are stored bit rates regarding video, audio and SP that are input from the key operation/display portion 4. For example, regarding the bit rate as to video data, there can be considered two cases, one being a case where the bit rate is input with a numeric value and the other being a case where the bit rate is input in a form of selecting as a picture image quality mode any one of a high picture image quality mode (high bit rate), ordinary picture image quality mode, and long-time mode (low bit rate). In the encode information processing portion 59, in a case where one of these picture image quality modes has been input (selected), this selected picture image quality mode is converted to an actual bit rate.

The system processor portion 54 is equipped with a system time clock (STC) 54A, register 54B, and pack production processing portion 54C as later described. Also, the video decoder portion 58, audio decoder portion 60 and sub-video decoder portion 62, video encoder portion 67, audio encoder portion 68, and sub-video encoder portion 69 are respectively similarly equipped with system time clocks (STC) 58A, 60A, 62A, 67A, 68A, 69A.

As illustrated in FIG. 2, the disk drive portion 30 is equipped with a motor drive circuit 11, spindle motor 13, optical head 32, feed motor 33, focus circuit 36, feed motor drive circuit 37, tracking circuit 38, head amplifier 40, and servo processing circuit 44.

The optical disk 10 is loaded on the spindle motor 13 that is driven by the motor drive circuit 11, and is rotated by this spindle motor 13. An optical head 32 for radiating a laser beam onto the optical disk 10 is placed under the optical disk 10.

From the system CPU portion 50 illustrated in FIG. 1 there is supplied to the servo processing circuit 44 a control signal that serves as an access signal. In response to this control signal, a head moving signal is supplied from the servo processing circuit 44 to the feed motor drive circuit 37. This circuit 37 supplies a drive signal to the feed motor 33. Accordingly, the feed motor 33 is driven, whereby the optical head 32 is moved in the radial direction of the optical disk 10.

When performing data recording with respect to the optical disk 10, an analog video signal and sub-video signal from a video input terminal 55 and an analog audio signal from an audio input terminal 53 are sent to the A/D processing portion 63 and, in this portion 63, are converted to digital signals.

The video data and sub-video data, and audio data, which are output from the A/D processing portion 63 are subjected to encode processing including compression encoding based on the bit rate (Bit Rate) information from the encode information processing portion 59, addition of error correction codes, etc. in their corresponding video encode portion 67, audio encode portion 68, and sub-video encode portion 69. These data pieces are sent to the system processor portion 54. It is to be noted that the bit rate (Bit Rate) information from the encode information processing portion 59 in this case represents the bit rate of a video object. Defining strictly, the bit rate of the video object is a sum total of the respective bit rates of the video, audio, sub-video, and navigation data. Regarding the video data, compression encoding is performed thereon in accordance with a so-called "MPEG 2", regarding the sub-video data, compression thereof is performed in accordance with a so-called "run length encoding", and regarding the audio data, encoding thereof is performed in accordance with a so-called "AC-3", "linear PCM", etc.

The video data and sub-video data, and audio data, which have been respectively encode-processed are multiplexed by the system processor portion 64 and made into recording data, under the management of the system CPU portion 50 that is controlled in accordance with the program that has been recorded in the system ROM/RAM portion 52.

This recording data is read out after having been stored once in the data RAM portion 56 and then is sent into the head amplifier 40 of the disk drive portion 30.

The optical head 32 is driven in correspondence with the recording data from the head amplifier 40, whereby this recording data is recorded into the optical disk 10.

When reproducing data from the optical disk 10, a prescribed sector that has been formed on the recording layer 16 of the optical disk 10 is accessed by the optical head 32. The reproduction data at this time is reproduced from this prescribed sector and is supplied from the optical head 32 to the head amplifier 40 and amplified by this head amplifier 40, and is output from the disk drive portion 30.

The thus-output reproduction data is stored into the data RAM portion 56 by the system processor portion 54 under the management of the system CPU portion 50 that is controlled with the program that has been recorded in the system ROM/RAM portion 52.

The thus-stored reproduction data is processed by the system processor portion 54 and is thereby classified into video data and sub-video data, and audio data, which are output to the video decoder portion 58, audio decoder portion 60, and sub-video decoder portion 62, respectively.

In the video decoder portion 58, audio decoder portion 60, and sub-video decoder portion 62, decode processing, which is composed of error correction processing, extension decoding, etc., is performed on these respective classified data pieces.

The thus-decode-processed video data and sub-video data, and audio data are converted to analog video signal, sub-video signal, and audio signal by the D/A and data reproduction processing circuit 64. Whereby, the video signal is supplied to the monitor portion 6 and the audio signal is supplied to the speaker portion 8. As a result, a picture image is displayed on the monitor portion 6 by the video signal and sub-video signal and a voice is played back from the speaker portion 8 by the audio signal.

It is to be noted that a detailed operation of the optical disk recording and reproducing apparatus 12 illustrated in FIG. 1, and a detailed operation of the cell ID information processing portion 65, encode time information processing portion 66, encode information producing portion 81, and pack production processing portion 54C illustrated therein, will be later explained in detail with reference to a logical format of the next-explained optical disk 10.

Figure 4:
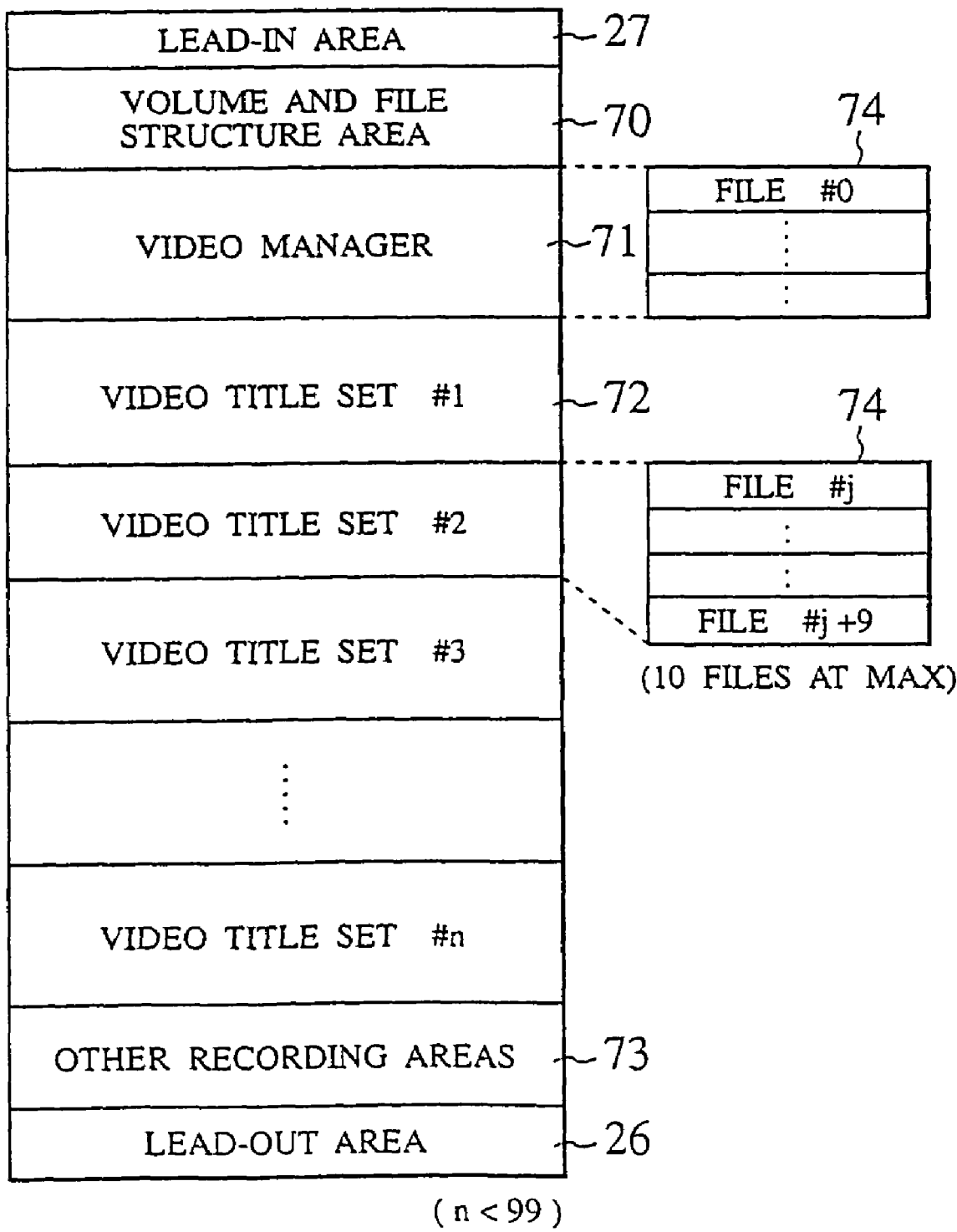
FIG. 4 is a view illustrating the structure of a logical format of the optical disk.

In the data recording region 28 from the lead-in region 27 to the lead-out region 26 of the optical disk 10 illustrated in FIG. 1, data is recorded in the volume and file structure such as illustrated in FIG. 4. This structure is determined as a logical format in accordance with a prescribed standard, e.g., micro UDF (micro UDF) and ISO 9660.

In the data recording area 28, recording is done by this area being divided physically into a plurality of sectors at the time of recording as has been already explained. To each of the physical sectors there is allotted a serial number. In the following explanation, the logical address means a logical sector number (LSN) as defined in the micro UDF (micro UDF) and ISO 9660. The logical sector has the same size of 2048 bytes as in the case of the size of the physical sector. Each of the logical sectors has added thereto a logical sector number (LSN) that is a serial number, as in the case of the physical sector number.

As illustrated in FIG. 4, this volume and file structure has a hierarchical structure, in which there are disposed a video manager 71, at least one or more video title sets 72, and other recording areas 73. Each of these areas is classified in units of a logical sector. Here, one logical sector is defined as having a size of 2048 bytes as in the case of a conventional CD. Similarly, one logical block is also defined as having a size of 2048 bytes. Accordingly, one logical sector is defined as being one logical block. It is to be noted that the video title set 72 has stored therein compressed video data, sub-video data, and audio data, and reproduction information therefor and is similarly constructed of a plurality of files.

The volume and file structure 70 corresponds to a management area that is determined in the micro UDF and ISO 9660 and, through this area, the video manager 71 is stored into the system ROM/RAM portion 52.

Figure 5:
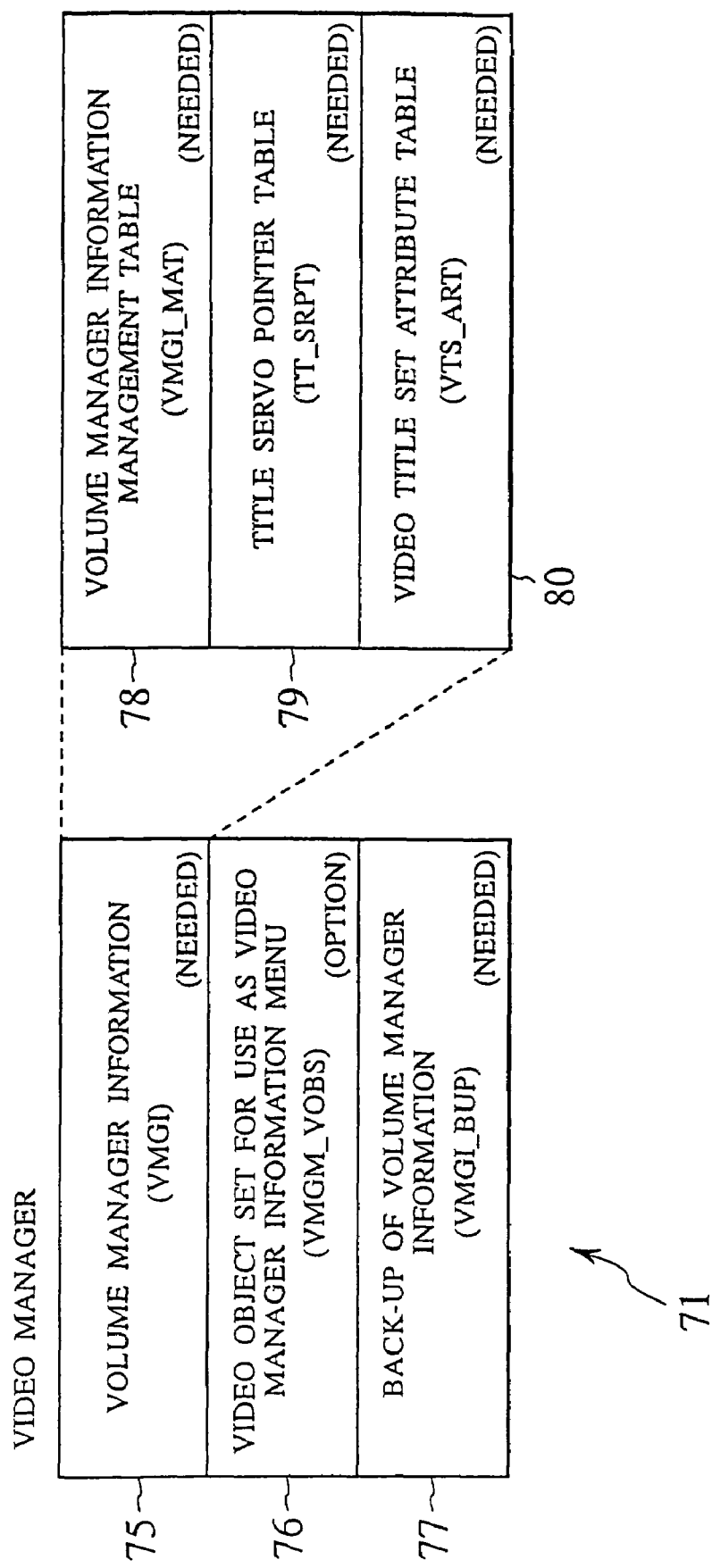
FIG. 5 is a view illustrating the structure of a video manager.

The video manager 71 is constructed of a plurality of files 74 starting with a file #0. Specifically, as illustrated in FIG. 5, it is constructed of a volume manager information (VMGI) 75, a video object set for use as video manager information menu (VMGM_VOBS) 76 and back-up of volume manager information (VMGI_BUP) 77. Further, the volume manager information (VMGI) 75 is constructed of a volume manager information management table (VMGI_MAT) 78, title search pointer table (TT_SRPT) 79, and video title set attribute table (VTS_ART) 80.

Figure 6:
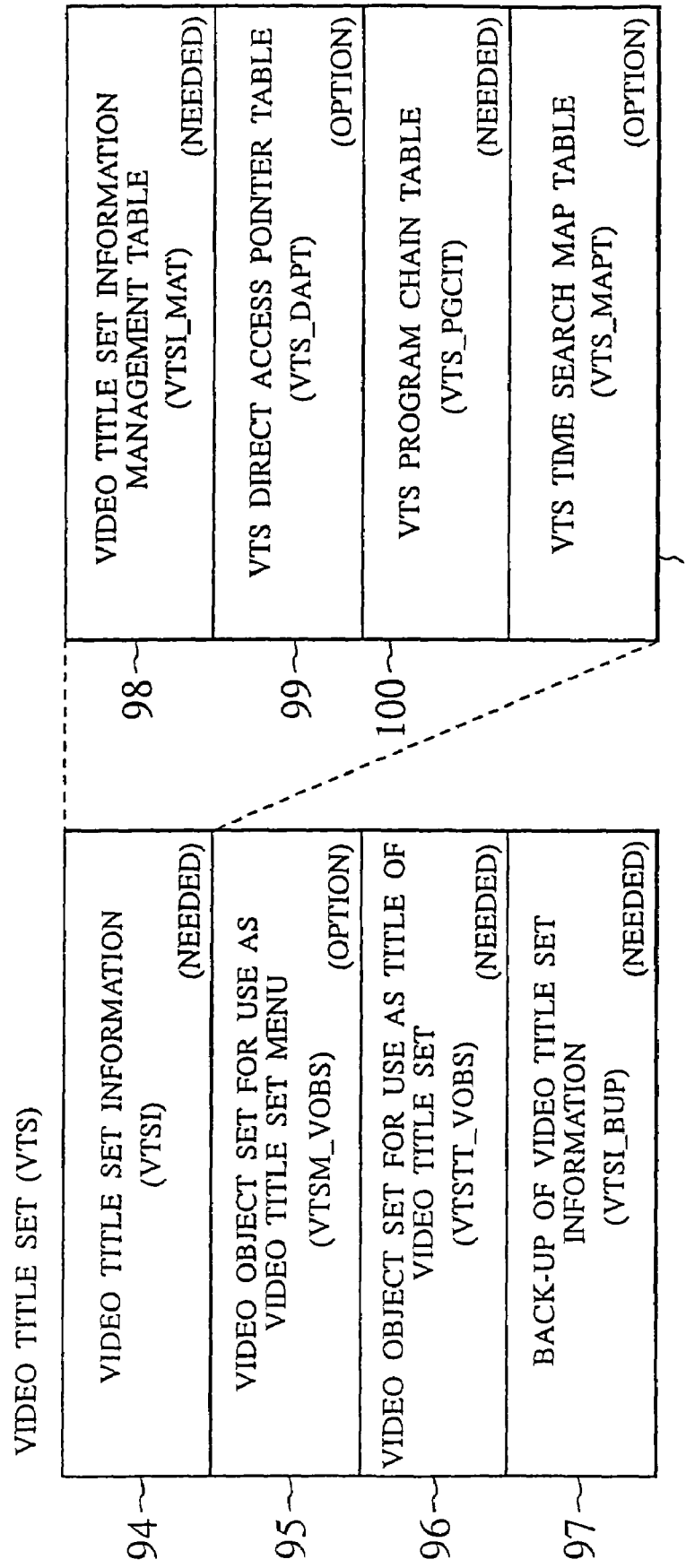
FIG. 6 is an explanatory view illustrating the structure of a video title set.

Also, each video title set 72 is constructed of 10 pieces at max. of files 74 starting with a file #j. Specifically, as illustrated in FIG. 6, it is constructed of a video title set information (VTSI) 94, video object set for use as video title set menu (VTSI_VOBS) 95, video object set for use as title of video title set (VTSTT_VOBS) 96, and back-up of video title set information 97. Further, the video title set information (VTSI) 94 is constructed of a video title set (VTS) information management table (VTSI_MAT) 98, VTS direct access pointer table (VTS_DAPT) 99, VTS program chain table (VTS_PGCIT) 100, and VTS time search map table (VTS_MAPT) 101.

Figure 7:
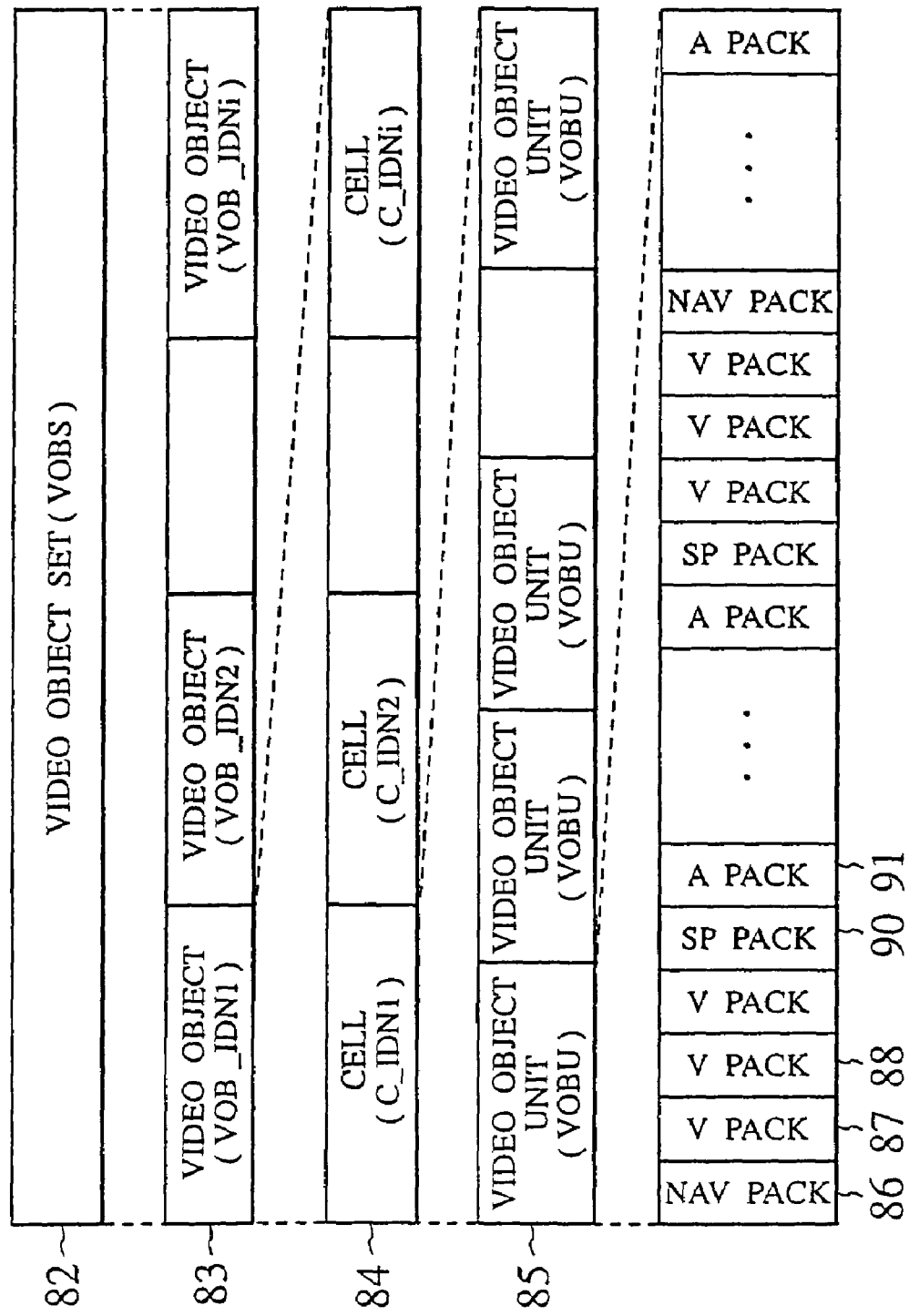
FIG. 7 is a view illustrating an example of the structure of a video object set (VOBS) in accordance with the DVD-video standard or specifications.

Here, an explanation will be given of the structure of a video object set (VOBS) 82 with reference to FIG. 7. FIG. 7 illustrates an example of the video object set (VOBS) 82 in accordance with the DVD-video standard or specifications.

As the types of this video object set (VOBS) 82, as described above, there are three types of video object sets, two of which are video object sets for use as two menus 76 and 95, and the remainder of which is a video object set for use as title 96. Namely, in the video manager 71, there is the video object set for use as video manager information menu (VMGM_VOBS) 76. In the video title set (VTS) 72, there are the video object set for use as video title set menu 95 and at least one video object set for use as video object set title (VTSTT_VOBS) 96. Any one of the video object sets 82 is different only in terms of its use purpose and has the same structure.

As illustrated in FIG. 7, the video object set (VOBS) 82 is defined as an aggregation of one or more video objects (VOB) 83 and each video object 83 in the same video object set (VOBS) 82 is used for the same use purpose. Ordinarily, the for-menu video object set (VOBS) 82 is constructed of one video object (VOB) 83 and has stored therein data that displays a plurality of for-menu picture image screens.

In contrast to this, the for-title video object set (VOBS) 82 is ordinarily constructed of a plurality of video objects (VOB) 83. It is to be noted that, with regard to the video object (VOB) 83 in an ordinary 1-story picture movie, one video object (VOB) 83 corresponds to one video object set (VOBS) 82, and one video stream is complete with the one video object set (VOBS) 82.

To the video object (VOB) 83 there is added an identification number (IDN #j), by means of which this video object (VOB) 83 can be particularized.

Figure 8:
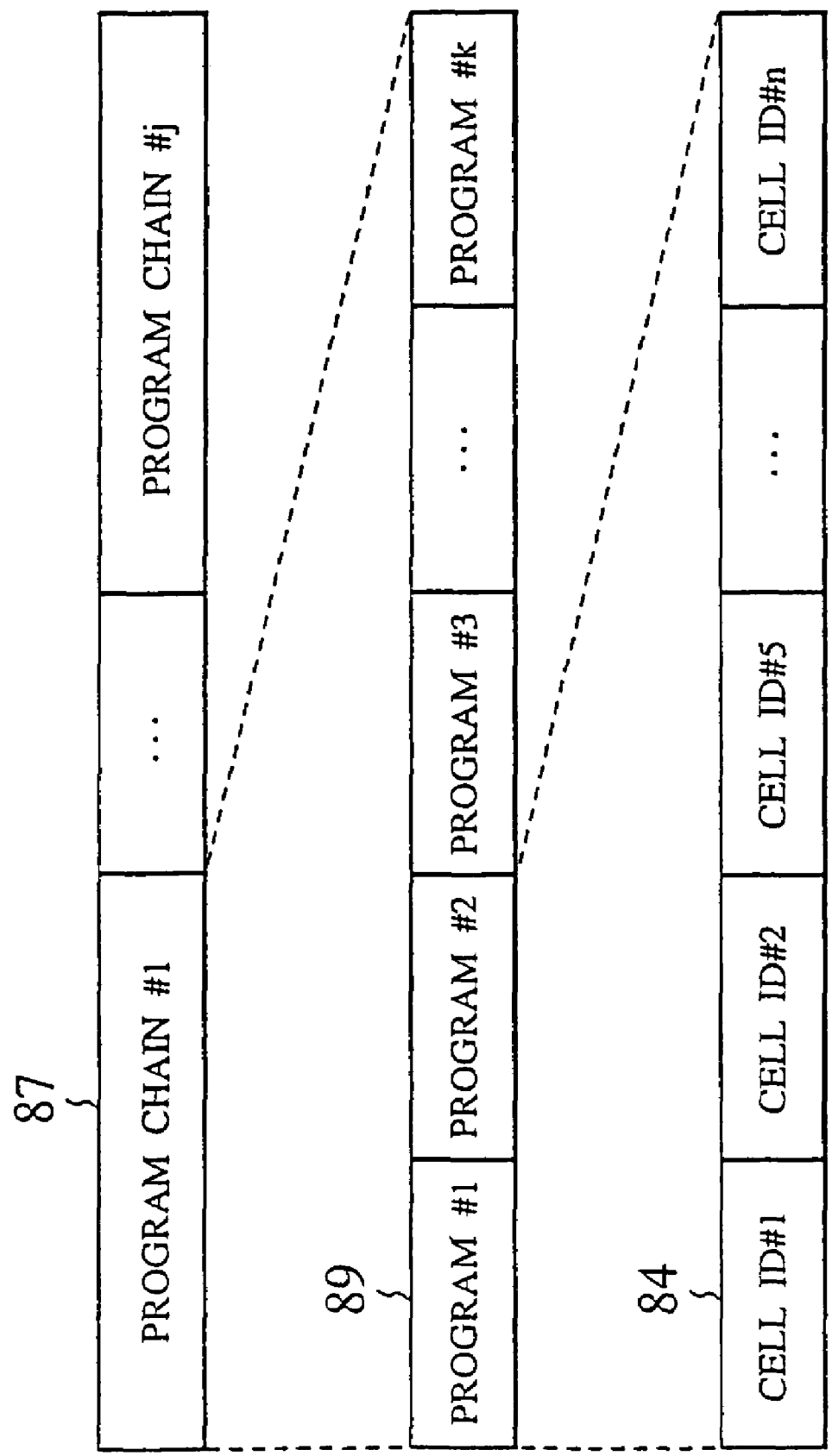
FIG. 8 is an explanatory view illustrating the structure of a video object unit.

The video object (VOB) 83 is constructed of one or a plurality of cells (data cells) 84. Here, the "cell" is a fundamental unit of the contents to be reproduced and one cell can be used in different program chains (PGC) within one video title set (VTS). One cell must be constructed of an integral number of video object units (VOBU). As illustrated in FIG. 8, the program chain (PGC) has a list for designating the cells in the order in which they are reproduced. An ordinary video stream is constructed of a plurality of cells.

However, there is also a case where the for-menu video stream, i.e., video object (VOB) 83, is constructed of one cell 84.

To the cell, there is added a cell identification number (C_IDN #j), by means of which the cell 84 is particularized. Namely, the cell identification number is a serial number that is imparted to the cell within the video object (VOB). In one video object (VOB), there can be included the cells covering from the cell whose identification number is 1 to the cell whose identification number is 255 at max. The cell identification number is written into the data search information (DSI) and program chain information (PGCI) together with the video object ID number (VOB_IDN).

As illustrated in FIG. 7, each cell 84 is constructed of one or a plurality of video object units (VOBU) 85, ordinarily a plurality of video object sets (VOBU) 85.

Here, the video object unit (VOBU) 85 is defined as a row of packs having one navigation pack (NAV pack) 86 at its foremost position. Namely, the video object unit (VOBU) 85 is defined as an aggregation of all packs that are covered and recorded from a navigation pack 86 to a pack immediately before the next navigation pack. The reproduction time length of the video object unit (VOBU) 85 corresponds to the reproduction time length of the video data constructed of a singular or a plural GOP. This reproduction time length is defined as falling within a range of from 0.4 second inclusive to 1 second inclusive. In the MPEG, 1 GOP represents compressed picture image data corresponding ordinarily to a time length of 0.5 second and corresponds to 15 sheets or so of picture images.

As described above, in a case where recording the video data (main video data) and sub-video data, and audio data, for example, that have been input in this embodiment into the optical disk 10, it is arranged that the thus-input video data is compressed into packs defined in the MPEG 2; the thus-input sub-video data is compressed into packs defined in accordance with the run length encoding technique; the thus-input audio data is encoded in accordance with the so-called AC-3 or linear PCM technique; and these data pieces are stored into the video object unit 85 as a row of packs to be reproduced within a prescribed period of time. In this way, as illustrated in FIG. 7, the video packs 88, sub-video packs 90, and audio packs 91 as defined in the MPEG standard are disposed within the video object unit 85.

Figure 9:
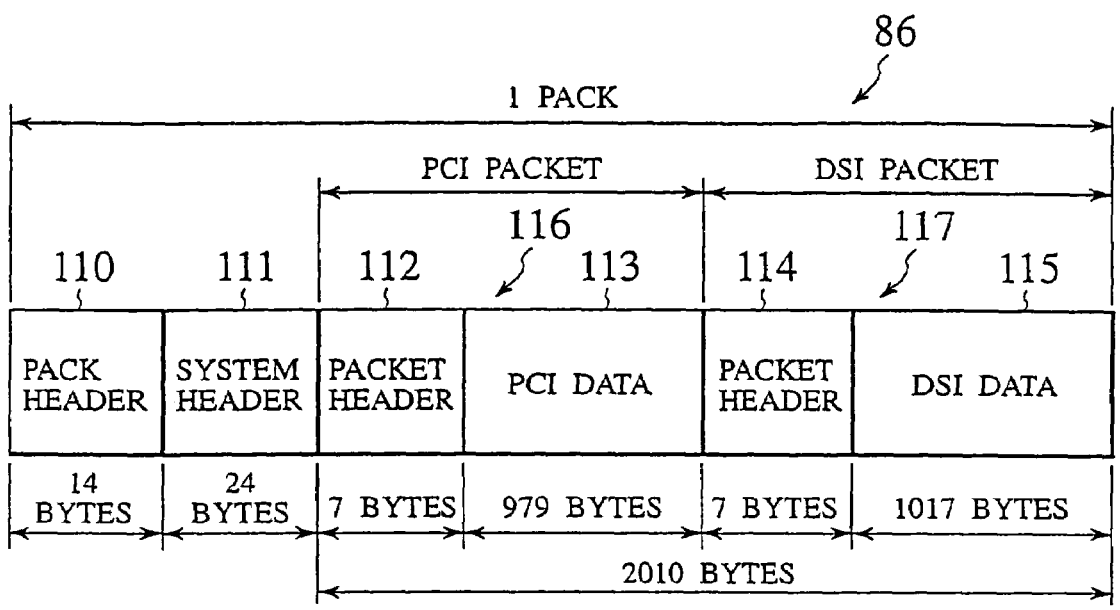
FIG. 9 is an explanatory view illustrating the structure of a navigation pack in accordance with the DVD-video standard or specifications.

In FIG. 9, illustration is made of a structure of the navigation pack 86 in accordance with the DVD-video standard or specifications. As illustrated in FIG. 9, the navigation pack 86 is constructed of a pack header 110, system header 111, playback control information (PCI) packet 116 (packet header 112 and PCI data 113), and data search information (DSI) packet 117 (packet header 114 and DSI data 115). The reproduction or playback control information is navigation data for making presentation in synchronism with the state of reproduction of the video data within the video object unit 85, namely, f or making a change of the contents of the display. Namely, the reproduction control information is information for determining the reproduction conditions in accordance with the state of the presented data, in other words, real-time control data that has been disposed in a dispersed form on the stream of data. Also, the data search information is navigation data for executing a search for the video object unit 85. Namely, this search information is one for performing fast forward/backward wind reproduction and seamless reproduction, i.e., is real-time control data that has been disposed in a dispersed form on the data stream.

Figure 10:
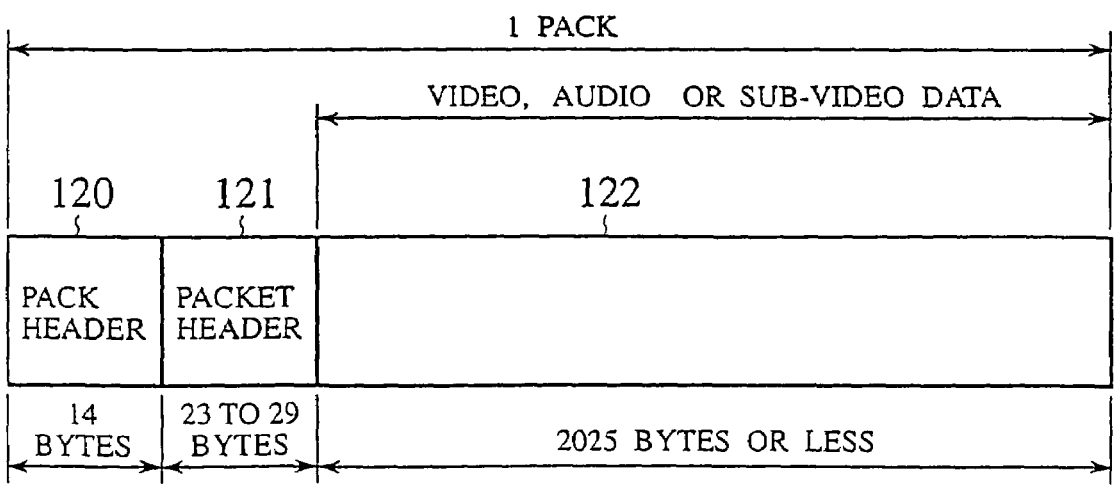
FIG. 10 is an explanatory view illustrating the structure of a video, audio and sub-video pack.

In FIG. 10, illustration is made of the structure of a video, audio, and sub-video pack. As illustrated in FIG. 10, the video, audio, and sub-video pack is constructed of a pack header 120, packet header 121, and video, audio, or sub-video data 122.

FIG. 11 is an explanatory view illustrating the contents of data search information (DSI) described in the navigation pack (NV_PCK) in accordance with the DVD-video standard or specifications. FIG. 12 is an explanatory view illustrating the contents of DSI general information (DSI_GI) described in the DSI in accordance with the DVD-video standard or specifications. FIG. 13 is an explanatory view illustrating the contents of seamless playback information (SML_PBI) described in the DSI in accordance with the DVD-video standard or specifications.

Although this navigation pack 86 has set therein the ID number (cell identification number) of the data cell to which the video object unit 85 belongs as shown in FIG. 12, in this setting case, going on producing the packs while encoding, for example, video data and audio data on a real time basis is followed by the possibility of the cell identification number becoming short of the cells in terms of the number, which makes it difficult to perform real time recording.

On this account, in the optical disk recording and reproducing apparatus 12 according to the first embodiment of the present invention, where converting the data into packs, it is arranged for the cell ID information processing portion 65 to set the recordable time length of the cell according to the key operation input that is done from the key operation/display portion 4 and, while comparing this cell recordable time length and the image-recording time that is passing, to output the cell identification number and for the pack production processing portion 54C to set the cell identification number of the video object unit 85 within the navigation pack 86. Namely, the cell ID information processing portion 65 previously sets as the cell recordable time length the capacity per cell (the length of the cell in terms of the time) and a sum total of the cells within the video object unit 85, according to the key operation input that is done from the key operation/display portion 4. And the portion 65 produces the cell identification number according to this cell recordable time length information and the image-recording passage time information. On the other hand, the pack production processing portion 54C sets the cell identification number within the video object unit 85 within the navigation pack 86, according to the cell identification number that has been set by the cell ID information processing portion 65.

According to this method, it becomes possible, while encoding the video and audio data on a real time basis, to unify the reproduction information for reproducing the video object unit and the search information necessary for searching another video object unit into a pack and simultaneously to record them into the optical disk 10.

Namely, according to the first embodiment of the present invention, it is possible, while real time encoding the video data and audio data, to unify the reproduction information for reproducing the video object unit 85 and the search information necessary for searching another video object unit 85 into a pack and thereby simultaneously to record them into the optical disk 10, and so it becomes possible to search and reproduce necessary information immediately after recording has ended. Also, it is also possible to omit the use of a memory for storing therein the compression-encode terminating time.

Additionally, as an example of setting the cell recordable time length by way of the key operation/display portion 4, for example, it is possible to consider such a setting example wherein the cell recordable time length sequentially increases in such a way as 1 min., 2 min., 3 min., . . . each time a prescribed key is depressed once. Also, when the key operation/display portion 4 is equipped with, for example, a so-called "ten-key unit" consisting of ten keys of from 0 to 9 inclusive, it is also possible to set an arbitrary cell recordable time length by the use of this ten-key unit.

Further, as described above, the reproduction control information (PCI) and data search information (DSI) are written into the navigation pack 86 and accordingly, into this navigation pack 86, there are written the reproduction termination time of the video data within the video object (VOB) and the reproduction termination time of the audio data within the video object as shown in FIG. 13. However, it happens that the reproduction termination time of the video data within the video object and the reproduction terminating time of the audio data within the video object (VOB) become non-fixed when producing a pack while encoding the video data and audio data on a real time basis. This makes it impossible to perform real-time recording.

On this account, in the first embodiment of the present invention, when unifying the information pieces into a pack, it is arranged for the encode time information processing portion 66 to produce the encode time according to the key operation input from the key operation/display portion 4 and for the pack production processing portion 54C of the system processor portion 54 to write the reproduction termination time of the video data within the navigation pack 86 and the reproduction termination time of the audio data within the video object (VOB) while referring to this encode time.

According to this method, it is possible to construct, while real time encoding the video data and audio data, the navigation pack 86 prepared by the reproduction control information (PCI) and data search information (DSI) being packed and therefore to record this navigation pack 86 into the optical disk 10 simultaneously with the encoding of the data.

Namely, according to the first embodiment, since it is possible to record, while encoding the video data and audio data on a real time basis, the navigation pack 86 having unified therein as a pack the reproduction control information (PCI) and data search information (DSI) into the optical disk 10 simultaneously with the encoding of the data, it becomes possible to search and reproduce necessary information immediately after recording has ended. Also, it is possible to dispense with a memory for storing the compression-encode termination time therein.

Additionally, as an example of the encode time length set using the key operation/display portion 4, for example, it is possible to consider such a time length which sequentially increases in such a way as 5 min., 10 min., 15 min., or 0.5 hr., 1 hr, 1.5 hrs., . . . each time a prescribed key is depressed once. Also, when the key operation/display portion 4 is equipped with, for example, a so-called "ten-key unit" consisting of ten keys of from 0 to 9 inclusive, it is also possible to set an arbitrary time length by the use of this ten-key unit.

Furthermore, into the navigation pack 86, write is made of the termination address of an I picture that is a reference picture in the MPEG standard as shown in FIG. 12. However, in a case where producing a pack while encoding the video data and audio data on a real time basis, because the amount of coded data per picture cannot be designated, it is impossible to record the termination address of the reference picture into the navigation pack 86 on a real time basis. Namely, as has been described above, it is impossible to record into the Navigation pack 86 in a real-time way the termination address of an initial reference picture (I picture) after the data search information (DSI) packet, the termination address of the second reference picture (I picture or P picture) after the data search information (DSI) packet, and the termination address of the third reference picture (I picture or P picture) after the data search information (DSI) packet.

In view of the above, in the first embodiment, it is arranged, where performing the packing, for the encode information producing portion 81 to produce, for example, a predetermined size of the reference picture according to the key operation input from the key operation/display portion and, for the pack production processing portion 54C of the system processor portion 54, to write the termination address of the reference picture within the navigation pack 86 while referring to this predetermined size of it.

According to this method, it is possible to construct, while real time encoding the video data and audio data, the navigation pack 86 prepared by the reference picture termination address that becomes necessary for reproduction of the video object unit 85 being packed and therefore to record this navigation pack 86 into the optical disk 10 simultaneously with the encoding of the data.

Namely, according to the first embodiment, since it is possible to record, while encoding the video data and audio data on a real time basis, the navigation pack 86 having unified therein as a pack the reference picture termination address into the optical disk 10 simultaneously with the encoding of the data, it becomes possible to search and reproduce necessary information immediately after recording has ended. Also, it is possible to dispense with a memory for storing the compression-encode termination time therein.

Setting the cell recordable time length with the use of the cell ID information processing portion 65, setting the encode time length with the use of the encode time information processing portion 66, and setting the reference picture termination address with the use of the encode information producing portion 81, that are performed as mentioned above, can be done respectively separately, or simultaneously, or in a form wherein any of them is combined with each other. Further, the optical disk recording and reproducing apparatus 12 of the first embodiment of the present invention may be constructed not only by being equipped with all of the cell ID information processing portion 65, encode time information processing portion 66, and encode information producing portion 81, but also by being equipped with any one of them or with any two in combination.

Figure 14:
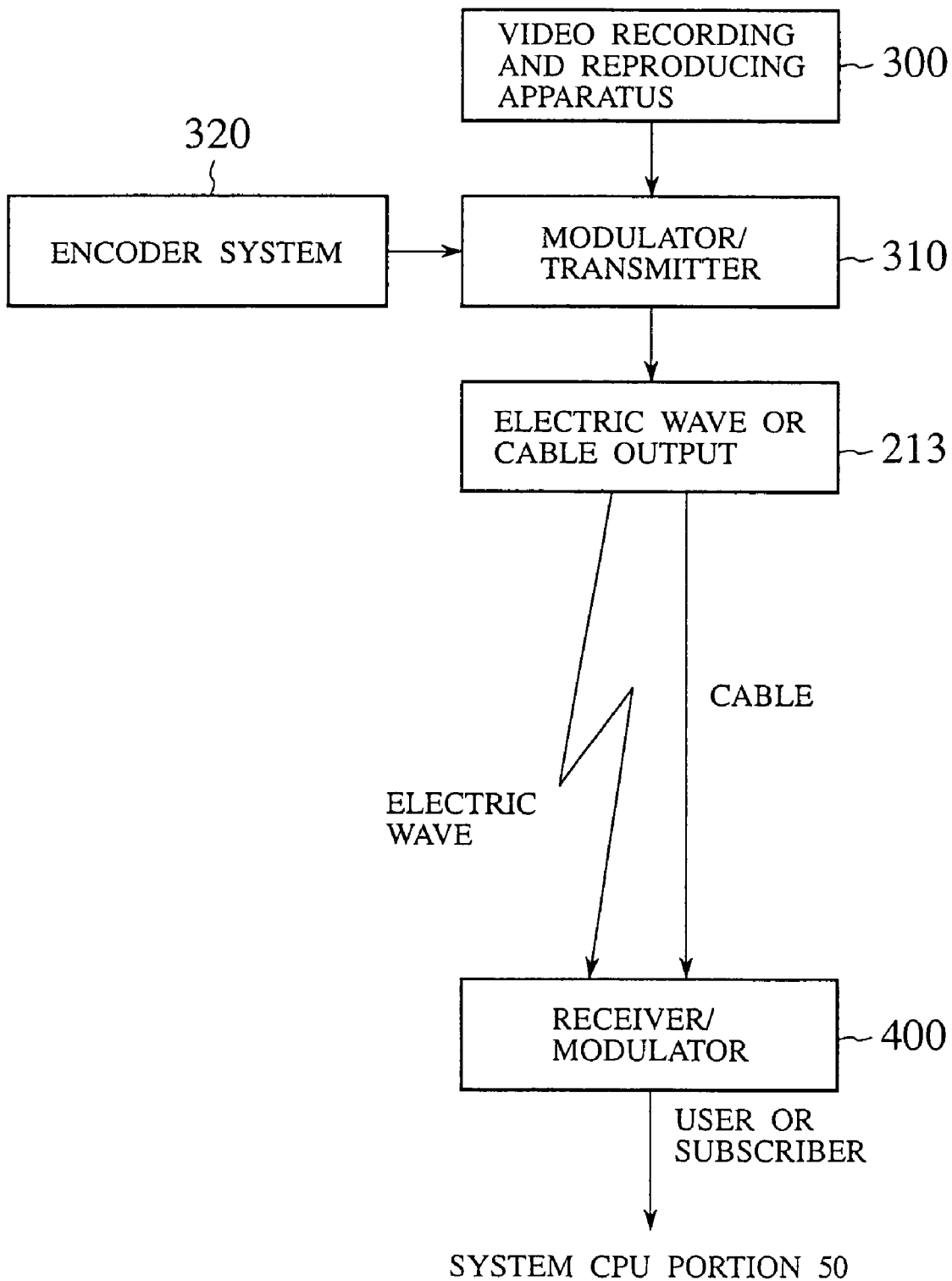
FIG. 14 is a schematic diagram illustrating a system for transferring the video title set through a communication system.

Incidentally, the above-described structure is not limited to one wherein recording is done into a recording medium such as an optical disk, and can be also applied to a communication system such as that illustrated in FIG. 14. Namely, the physical data that has been produced in accordance with the above-described procedures may be sent to a user or a cable subscriber side by a modulator/transmitter 310 by way of electric waves or a cable. Also, encoded data may be produced on a side of a provider such as a broadcasting station by the optical disk recording and reproducing apparatus-12. illustrated in FIG. 1 and this encoded data may be similarly sent to a user or a cable subscriber side by the modulator/transmitter 310 by way of electric waves or a cable.

Although in the above explanation the video object unit has been explained as a row of data that includes video, audio, and sub-video data, it is sufficient if this unit includes any one of video, audio, and sub-video data pieces. Namely, this unit may be constructed of only audio pack alone or only sub-video pack alone.

Next, a second embodiment of the present invention will be explained. The construction of this second embodiment is fundamentally the same as that of the above-described first embodiment. Therefore, in the following description, only the respects in which the former is different from the latter will be explained.

In this second embodiment, it is arranged, when compression encoding and packing the signal containing at least one piece of video data, to set the reproduction termination time of, for example, the video data within the navigation pack while referring to the bit rate of the video object after encoding thereof and the remaining amount of capacity of the recording medium under the management of the file system. Namely, in the second embodiment, it is arranged for the pack production processing portion 54C to set the reproduction termination time of the video data within the video object (VOB) and the reproduction termination time of the audio data within the video object that is to be recorded in the navigation pack 86, according to the recordable capacity (Free Space Size) of the optical disk 10 that has been obtained from the file system recorded in the optical disk 10, the number of video frames recorded during 1 second (Frame Rate, e.g., 30 in case of the NTSC; and 25 in case of PAL), the factor (Vts Factor$\leqq$255) representing how many video objects (VOB) the video title set (VTS) is constructed of, the bit rate (Bit Rate) that has been obtained from the encode information processing portion 59, and the factor (GOP Factor) representing how many video frames the GOP is constructed of. It is to be noted that the bit rate (Bit Rate) generated from the encode information processing portion 59 and the factor (GOP Factor) representing how many video frames the GOP is constructed of can be, for example, either preset or determined individually through arithmetic operations according to the key operation input from the key operation/display portion 4. The factor (GOP Factor) represents the above-described number of picture image frames that constitute 1 GOP, and, in the MPEG, is called "an N value". Also, regarding the file system, a detailed technique thereof is disclosed in, for example, Japanese Patent Application Laid-Open Publication No.H8-263969, etc. and so an explanation thereof is omitted. Further, the factor (Vts Factor) represents the number of video objects constituting the VTS and, in a so-called DVD-video standard, is defined as 255 at max. The larger this factor (Vts Factor) is, the more effectively the disk recording area can be utilized. Therefore, the default value thereof is set to be 255 (Vts=255).

Here, while the video object (VOB) is constructed of a plurality of video object units 85 as described above, the factor (Vob Factor) representing how many video object units 85 the video object (VOB) is constructed of is determined as a maximal plus integer that satisfies the following inequality (1). Namely, when representing the factor (Vob Factor) indicating how many units the video object is constructed of by VOF, representing the recordable capacity (Free Space Size) of the recording medium by FSS, representing the number of frames (Frame Rate) recorded during 1 second by FR, representing the factor (Vts Factor) indicating how many objects (VOB) the video title set (VTS) is constructed of by VTF, representing the bit rate (Bit Rate) that has been obtained from the encode information processing portion 59 by BR, and representing the factor (GOP Factor) indicating how many video frames the GOP is constructed of by GF, the VOF is determined as a maximal plus integer that satisfies the following inequality (1).

$$VOF \leq (FSS \times FR)/(VTF \times BR \times GF) \quad (1)$$

The reproduction termination time PET of the video data, etc. is determined in accordance with the following equation (2).

$$PET = VOF \times (GF/FR) \quad (2)$$

According to this second embodiment, as in the case of the first embodiment, it is possible to construct, while encoding the video data and audio data on a real time basis, the navigation pack 86 having unified therein as a pack the reproduction or playback control information (PCI) and data search information (DSI) to thereby record the navigation pack 86 into the optical disk 10 simultaneously with the encoding of the data.

Further, according to the second embodiment, in a case where previously setting the recording time length as in the case of, for example, a so-called "timer reservation", it becomes possible to perform recording into the optical disk 10 with no useless information being added. Namely, when previously setting the recording period of time as in the case of a timer reservation, it happens that in a case where at the time when, for example, a timer reservation is made a user has stopped the recording earlier than the time corresponding to the time length that has been set as above, useless data that corresponds to this set time length is inconveniently recorded in the last video object. However, in this second embodiment, such inconvenience does not occur and this makes it possible to efficiently record with no complex setting being performed by the user.

It should be understood that many modifications and adaptations of the invention will become apparent to those skilled in the art and it is intended to encompass such obvious modifications and changes in the scope of the claims appended hereto.

What is claimed is:

1. A data recording method comprising the steps of:
   packing input data including at least video data into a plurality of packs in real time;
   storing the plurality of packs within a video object unit as a row of packs to be reproduced within a prescribed period of time;
   arraying one or more video object units to constitute a data cell;
   arraying one or more data cells to constitute a video object;
   disposing a search information pack having prescribed search information at a foremost position of the row of packs in the video object unit, the search information including at least a data reproduction termination time and data cell identification number within the video object;
   setting the data cell identification number of the video object unit to be stored within the search information pack in real time according to a unit recording-time length of one data cell that is designated beforehand and actual recording time length; and
   recording a video object set consisting of one or more video objects into a recoding medium DVD-R,
   wherein all the steps are performed in conformity with predetermined video specifications having a data recording region from a lead-in region to a lead-out region, which provides for storage of the plurality of packs within a unit as a row of packs to be reproduced within a prescribed period of time, one or more units constituting a data cell and one or more data cells arrayed to constitute said video object, and
   wherein the predetermined video specifications define a video title set (VTS) constructed of a bit rate and a factor representing a number of video frames, and defining the number of video objects constituting the VTS as a predetermined maximum.

2. A data recording method according to claim 1, wherein the input data consists of at least video data and audio data; and in the predetermined video specifications the video data and audio data are compression encoded.

3. A data recording method comprising the steps of:
   packing input data including at least video data into a plurality of packs in real time
   storing the plurality of packs into packs within a video object unit as a row of packs to be reproduced within a prescribed period of time;
   arraying one or more video object units to constitute a data cell;
   arraying one or more data cells to constitute a video object;
   disposing a search information pack having prescribed search information at a foremost position of the row of packs in the video object unit, the search information including at least a data reproduction termination time within the video object;
   setting the data reproduction termination time to be stored within the search information pack in real time according to a signal processing time length that is designated beforehand; and
   recording a video object set consisting of one or more video objects into a recoding medium DVD-R,
   wherein all the steps are performed in conformity with predetermined video specifications having a data recording region from a lead-in region to a lead-out region, which provides for storage of the plurality of packs within a unit as a row of packs to be reproduced within a prescribed period of time, one or more units constituting a data cell and one or more data cells arrayed to constitute said video object, and
   wherein the predetermined video specifications define a video title set (VTS) constructed of a bit rate and a factor representing a number of video frames, and defining the number of video objects constituting the VTS as a predetermined maximum.

4. A data recording method according to claim 3, wherein the input data consists of at least video data and audio data; and in the predetermined video specifications the video data and audio data are compression encoded.

5. A data recording method comprising the steps of:
   packing input data including at least video data into a plurality of packs in real time
   storing the plurality of packs into packs within a video object unit as a row of packs to be reproduced within a prescribed period of time;
   arraying one or more video object units to constitute a data cell;
   arraying one or more data cells to constitute a video object;
   disposing a search information pack having prescribed search information at a foremost position of the row of packs in the video object unit, the search information including at least a data reproduction termination time and termination addresses of one or a plurality of reference information pieces within the video object;
   setting the termination addresses of one or the plurality of reference information pieces to be stored within the search information pack in real time according to a predetermined size of reference information that is designated beforehand; and recording a video object set consisting of one or more video objects into a recording medium DVD-R, wherein all the steps are performed in conformity with predetermined video specifications having a data recording region from a lead-in region to a lead-out region, which provides for storage of the plurality of packs within a unit as a row of packs to be reproduced within a prescribed period of time, one or more units constituting a data cell and one or more data cells arrayed to constitute said video object, and wherein the predetermined video specifications define a video title set (VTS) constructed of a bit rate and a factor representing a number of video frames, and defining the number of video objects constituting the VTS as a predetermined maximum.

6. A data recording method according to claim 5, wherein the input data consists of at least video data and audio data; and in the predetermined video specifications the video data and audio data are compression encoded.

7. A data recording method according to claim 6, wherein the termination addresses of the one or the plurality of reference information pieces are termination addresses of reference pictures that are recorded at the compression encoded video data.

8. A data recording method comprising the steps of:

packing input data including at least video data into a plurality of packs in real time storing the plurality of packs into packs within a video object unit as a row of packs to be reproduced within a prescribed period of time;

arraying one or more video object units to constitute a data cell;

arraying one or more data cells to constitute a video object;

disposing a search information pack having prescribed search information at a foremost position of the row of packs in the video object unit, the search information including at least a data reproduction termination time and termination addresses of one or a plurality of reference information pieces within the video object;

setting the termination addresses of one or the plurality of reference information pieces to be stored within the search information pack in real time according to a predetermined size of reference information that is designated beforehand; and recording a video object set consisting of one or more video objects into a recording medium DVD-R, wherein all the steps are performed in conformity with predetermined video specifications having a data recording region from a lead-in region to a lead-out region, which provides for storage of the plurality of packs within a unit as a row of packs to be reproduced within a prescribed period of time, one or more units constituting a data cell and one or more data cells arrayed to constitute said video object, and wherein the predetermined video specifications define a video title set (VTS) constructed of a bit rate and a factor representing a number of video frames, and defining the number of video objects constituting the VTS as a predetermined maximum of 255.

9. A data recording apparatus comprising:

input data packing means for packing input data including at least video data into a plurality of packs in real time;

pack storing means for storing the plurality of packs into packs within a video object unit as a row of packs to be reproduced within a prescribed period of time;

unit arraying means for arraying one or more video object units to constitute a data cell;

cell arraying means for arraying one or more data cells to constitute a video object;

search information pack disposing means for disposing a search information pack having prescribed search information at a foremost position of the row of packs in the video object unit, the search information including at least a data reproduction termination time and data cell identification number within the video object;

data cell identification number setting means for setting the data cell identification number of the video object unit to be stored within the search information pack in real time according to a unit recording-time length of one data cell that is designated beforehand and actual recording time length; and object set recording means for recording a video object set consisting of one or more video objects into a recording medium DVD-R, wherein all the steps are performed in conformity with predetermined video specifications having a data recording region from a lead-in region to a lead-out region, which provides for storage of the plurality of packs within a unit as a row of packs to be reproduced within a prescribed period of time, one or more units constituting a data cell and one or more data cells arrayed to constitute said video object, and wherein the predetermined video specifications define a video title set (VTS) constructed of a bit rate and a factor representing a number of video frames, and defining the number of video objects constituting the VTS as a predetermined maximum.

10. A data recording apparatus according to claim 9, wherein the input data consists of at least video data and audio data, and which further comprises signal processing means for compression encoding the video data and audio data as defined in the Predetermined video specifications.

11. A data recording apparatus comprising:

input data packing means for packing input data including at least video data into a plurality of packs in real time;

pack storing means for storing the plurality of packs within a video object unit as a row of packs to be reproduced within a prescribed period of time;

unit arraying means for arraying one or more video object units to constitute a data cell;

cell arraying means for arraying one or more data cells to constitute a video object;

search information pack disposing means for disposing a search information pack having prescribed search information at a foremost position of the row of packs in the video object unit, the search information including at least a data reproduction termination time within the video object;

signal processing time setting means for setting the data reproduction termination time to be stored within the search information pack in real time according to a signal processing time length that is designated beforehand; and object set recording means for recording a video object set consisting of one or more video objects into a recording medium DVD-R, wherein all the steps are performed in conformity with predetermined video specifications having a data recording region from a lead-in region, to a lead-out region, which provides for storage of the plurality of packs within a unit as a row of packs to be reproduced within a prescribed period of time, one or more units constituting a data cell and one or more data cells arrayed to constitute said video object, and wherein the predetermined video specifications define a video title set (VTS) constructed of a bit rate and a factor representing a number of video frames, and defining the number of video objects constituting the VTS as a predetermined maximum.

12. A data recording apparatus according to claim 11, wherein the input data consists of at least video data and audio data, and which further comprises signal processing means for compression encoding the video data and audio data as defined in the Predetermined video specifications.

13. A data recording apparatus comprising:

input data packing means for packing input data including at least video data into a plurality of packs in real time;

pack storing means for storing the plurality of packs into packs within a video object unit as a row of packs to be reproduced within a prescribed period of time;

unit arraying means for arraying one or more video object units to constitute a data cell;

cell arraying means for arraying one or more data cells to constitute a video object;

search information pack disposing means for disposing a search information pack having prescribed search information at a foremost position of the row of packs in the video object unit, the search information including at least a data reproduction termination time and termination addresses of one or a plurality of reference information pieces within the video object;

reference information termination address setting means for setting the termination addresses of one or the plurality of reference information pieces to be stored into within the search information pack in real time according to a predetermined size of reference information that is designated beforehand; and object set recording means for recording a video object set consisting of one or more video objects into a recording medium DVD-R, wherein all the steps are performed in conformity with predetermined video specifications having a data recording region from a lead-in region to a lead-out region, which provides for storage of the plurality of packs within a unit as a row of packs to be reproduced within a prescribed period of time, one or more units constituting a data cell and one or more data cells arrayed to constitute said video object, and wherein the predetermined video specifications define a video title set (VTS) constructed of a bit rate and a factor representing a number of video frames, and defining the number of video objects constituting the VTS as a predetermined maximum.

14. A data recording apparatus according to claim 13, wherein the input data consists of at least video data and audio data, and which further comprises signal processing means for compression encoding the video data and audio data as defined in the Predetermined video specifications.

15. A data recording apparatus according to claim 14, wherein the reference information termination address setting means sets the termination address of a reference picture recorded as the compression encoded video data, as the termination address of the reference information.

16. A data recording method comprising the steps of:

packing input data including at least video data into a plurality of packs in real time;

storing the plurality of packs within a video object unit as a row of packs to be reproduced within a prescribed period of time;

arraying one or more video object units to constitute a data cell;

arraying one or more data cells to constitute a video object;

disposing a search information pack having prescribed search information at a foremost position of the row of packs in the video object unit, the search information including at least a data reproduction termination time within the video object;

setting the data reproduction termination time to be stored within the search information pack in real time at least according to a recordable capacity of a recording medium DVD-R that has been obtained from a volume and file structure area recorded in the recording medium DVD-R and a bit rate that has been obtained from the system information; and recording a video object set consisting of one or more video objects into the recording medium DVD-R, wherein all the steps are performed in conformity with predetermined video specifications having a data recording region from a lead-in region to a lead-out region, which provides for storage of the plurality of packs within a unit as a row of packs to be reproduced within a prescribed period of time, one or more units constituting a data cell and one or more data cells arrayed to constitute said video object, and wherein the predetermined video specifications define a video title set (VTS) constructed of a bit rate and a factor representing a number of video frames, and defining the number of video objects constituting the VTS as a predetermined maximum.

17. A data recording method according to claim 16, wherein a factor that represents how many video object units the video object is constructed of is determined as a maximal positive integer that satisfies a following inequality:

$$VOF \leq (FSS \times FS)/(VTF \times BR \times GF)$$

where the VOF represents a factor that represents how many video object units the video object is constructed of; the FSS represents the recordable capacity of the recording medium DVD-R; the FR represents a number of frames that are recorded during a unit length of time; the VTF represents a factor that represents a number of video objects in the video object set composed of a plurality of the video objects; the BR represents the bit rate of the video object; and the GF represents a factor that represents a number of frames in the group composed of a plurality of the frames.

18. A data recording method according to claim 16, wherein the input data consists of at least video data and audio data; and in the predetermined video specifications the video data and audio data are compression encoded.

* * * * *

UNITED STATES PATENT AND TRADEMARK OFFICE
CERTIFICATE OF CORRECTION

PATENT NO.         : 7,136,576 B1
APPLICATION NO. : 09/357744
DATED              : November 14, 2006
INVENTOR(S)       : Suzuki It is certified that error appears in the above-identified patent and that said Letters Patent is hereby corrected as shown below:

Claim 10, Column 20, Line 4,
Please delete
"Predetermined" and replace with
-- predetermined --

Claim 12, Column 21, Line 15,
Please delete
"Predetermined" and replace with
-- predetermined --

Claim 14, Column 21, Line 59,
Please delete
"Predetermined" and replace with
-- predetermined --

Signed and Sealed this

Twenty-third Day of January, 2007

JON W. DUDAS
*Director of the United States Patent and Trademark Office*